US012025787B2

(12) United States Patent
Liao et al.

(10) Patent No.: US 12,025,787 B2
(45) Date of Patent: Jul. 2, 2024

(54) AUGMENTED REALITY MICROSCOPE, IMAGE PROJECTION DEVICE AND IMAGE PROCESSING SYSTEM (71) Applicant: TENCENT TECHNOLOGY (SHENZHEN) COMPANY LIMITED, Guangdong (CN)

(72) Inventors: Jun Liao, Shenzhen (CN); Jianhua Yao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 436 days.

(21) Appl. No.: 17/470,210

(22) Filed: Sep. 9, 2021

(65) Prior Publication Data
US 2021/0405340 A1 Dec. 30, 2021

Related U.S. Application Data (63) Continuation of application No. PCT/CN2020/103710, filed on Jul. 23, 2020.

(30) Foreign Application Priority Data

Aug. 23, 2019 (CN) .......................... 201910785677.3

(51) Int. Cl.
*G02B 21/36* (2006.01)
*G02B 21/00* (2006.01)

(52) U.S. Cl.
CPC ....... *G02B 21/364* (2013.01); *G02B 21/0092* (2013.01); *G02B 21/361* (2013.01); *G02B 21/365* (2013.01)

(58) Field of Classification Search
CPC .......................... G02B 21/364; G02B 21/0092; G02B 21/361; G02B 21/365; G02B 27/283; G02B 21/368
See application file for complete search history.

(56) References Cited

U.S. PATENT DOCUMENTS 6,721,094 B1 * 4/2004 Sinclair .................... G01B 9/04
359/368
8,928,973 B2 1/2015 Chu et al.
(Continued)

FOREIGN PATENT DOCUMENTS

CN 205352958 U 6/2016
CN 109031643 A 12/2018
(Continued)

OTHER PUBLICATIONS

Chinese Office Action for 201910785677.3 dated Jan. 6, 2021.
(Continued)

*Primary Examiner* — Magda Cruz
(74) *Attorney, Agent, or Firm* — Sughrue Mion, PLLC (57) ABSTRACT An augmented reality microscope (ARM) includes an objective lens, an eyepiece, an N-ocular observation tube, where N is a positive integer greater than 2, an image obtaining assembly physically connected to the N-ocular observation tube by a physical interface on the N-ocular observation tube, and an image projection assembly including, an image projection apparatus, a lens apparatus, and a light splitting apparatus. Light generated by an observed object during observation that enters an optical path through the objective lens and light generated by the image projection apparatus that enters the optical path through the lens apparatus converges at the light splitting apparatus in the image projection assembly, the converged light passes through the N-ocular observation tube.

18 Claims, 3 Drawing Sheets (56) References Cited

U.S. PATENT DOCUMENTS

2020/0211233 A1* 7/2020 Siegel .................... G06F 3/013
2021/0215923 A1* 7/2021 Nakata ................ G02B 21/364

FOREIGN PATENT DOCUMENTS

| CN | 110488479 A | 11/2019 | |
| DE | 10021063 A1 * | 12/2000 | ............. G02B 21/22 |
| DE | 10020279 A1 * | 1/2001 | ............. G02B 21/22 |
| JP | 6-294933 A | 10/1994 | |

OTHER PUBLICATIONS

International Search Report for PCT/CN2020/103710 dated Oct. 27, 2020 (PCT/ISA/210).
Written Opinion of the International Searching Authority for PCT/CN2020/103710 dated, Oct. 27, 2020 (PCT/ISA/237).
Chinese Office Action for 201910785677.3 dated Mar. 24, 2020.

* cited by examiner

AUGMENTED REALITY MICROSCOPE, IMAGE PROJECTION DEVICE AND IMAGE PROCESSING SYSTEM

CROSS REFERENCE TO RELATED APPLICATION(S)

This application is a continuation application of International Application No. PCT/CN2020/103710, filed on Jul. 23, 2020, which claims priority to Chinese Patent Application No. 201910785677.3, filed with the China National Intellectual Property Administration on Aug. 23, 2019, the entire contents of which are incorporated by reference herein.

FIELD

The disclosure generally relates to the field of microscope technologies, and in particular, to an augmented reality microscope, an image projection device, and an image processing system.

BACKGROUND

Microscope technology is an important branch of optical instruments, and is widely used in numerous fields such as biology, medical, electronics, and semiconductor fields. With the development of image processing and artificial intelligence (AI) technologies, especially, technologies such as deep learning, an obtained microscopic image can be processed while a key target is automatically detected. Based on this, an augmented reality microscope (ARM) is utilized.

An ARM allows an observer to obtain other augmented information while observing a sample under a microscope, thereby helping an observer to quickly locate and quantify features of interest. For example, in a medical diagnosis scenario, while observing a section by using the ARM, a doctor can obtain a diagnosis result based on the section. That is, the ARM can superimpose the diagnosis result as augmented reality information on the section, so that the doctor can conveniently read a conclusion in real time in a field of view.

Currently, some ARMs are already available on the market. However, such ARMs have a complex structure, limited scalability, and poor augmented reality image quality, and need to be improved.

SUMMARY

According to an aspect of example embodiments, an augmented reality microscope (ARM) includes an objective lens, an eyepiece, an N-ocular observation tube, where N is a positive integer greater than 2, an image obtaining assembly physically connected to the N-ocular observation tube by a physical interface on the N-ocular observation tube, and an image projection assembly including, an image projection apparatus, a lens apparatus, and a light splitting apparatus. Light generated by an observed object during observation that enters an optical path through the objective lens and light generated by the image projection apparatus that enters the optical path through the lens apparatus converges at the light splitting apparatus in the image projection assembly, the converged light passes through the N-ocular observation tube, a first part of the converged light enters the eyepiece, and a second part of the converged light enters the image obtaining assembly to form an image, and the image obtaining assembly is configured to output the formed image to the image processing apparatus configured to process the image and output a processing result to the image projection apparatus.

According to an aspect of example embodiments, a method of an ARM is provided. The ARM includes an objective lens, an eyepiece, an N-ocular observation tube, where N is a positive integer greater than 2, an image obtaining assembly physically connected to the N-ocular observation tube by a physical interface on the N-ocular observation tube, and an image projection assembly including an image projection apparatus, a lens apparatus, and a light splitting apparatus. The method includes generating light by the image projection apparatus, converging, at the light splitting apparatus, light generated by an observed object that enters an optical path through the objective lens and the light generated by the image projection apparatus, passing the converged light through the N-ocular observation tube, thereby splitting the converged light into a first part that enters the eyepiece and a second part, forming an image based on the second part of the converged light entering the image obtaining assembly, outputting the formed image to the image processing apparatus, processing the formed image, and outputting a processing result based on the processed formed image.

According to an aspect of example embodiments, an image projection device, configured to be connected to a microscope to form an ARM, includes an image projection apparatus, a lens apparatus, and a light splitting apparatus. The image projection apparatus is configured to obtain a processing result by processing an image by an image processing apparatus and perform image projection on the processing result. Projected light enters an optical path through the lens apparatus and light generated by an observed object observed by the microscope enters the optical path through an objective lens of the microscope converge at the light splitting apparatus, and, after the converged light passes through an N-ocular observation tube of the microscope, a first part of the light enters an eyepiece of the microscope, and a second part of the light enters an image acquisition device, forming the image.

BRIEF DESCRIPTION OF THE DRAWINGS

In order to describe the technical solutions in the example embodiments of the disclosure more clearly, the following briefly describes the accompanying drawings for describing the example embodiments. Apparently, the accompanying drawings in the following description merely show some embodiments of the disclosure, and a person of ordinary skill in the art may still derive other accompanying drawings from these accompanying drawings without creative efforts.

DETAILED DESCRIPTION

To make a person skilled in the art understand solutions of the disclosure, the following describes the technical solutions in the embodiments with reference to the accompanying drawings in the embodiments. The described embodiments are merely some but not all of the embodiments. All other embodiments obtained by a person of ordinary skill in the art based on the embodiments without creative efforts shall fall within the protection scope of this application.

In the specification, claims, and accompanying drawings of this application, the terms "first", "second", "third", "fourth", and so on (if existing) are intended to distinguish between similar objects rather than describe a specific order or sequence. It may be understood that the data termed in such a way is interchangeable in proper circumstances, so that the embodiments described herein for example, can be implemented in other orders than the order illustrated or described herein. Moreover, the terms "comprise". "include", and any other variants thereof mean to cover the non-exclusive inclusion. For example, a process, method, system, product, or device that includes a list of steps or units is not necessarily limited to those steps or units that are clearly listed, but may include other steps or units not expressly listed or inherent to such a process, method, system, product, or device.

In view of the problems of a relatively complex structure, limited scalability, and low quality of an augmented reality image existing in some augmented reality microscopes (ARMs) on the market at present, the present disclosure provides an ARM. The ARM isolates an image obtaining optical path from an image projection optical path to avoid the image obtaining optical path and the image projection optical path from interfering with each other and to facilitate registration and calibration of images, ensuring the accuracy of a final processing result, thereby improving the quality of an augmented reality image.

In addition, an image projection module in the ARM does not require a plurality of light splitting apparatuses stacked together, so that a height by which the ARM is elevated by the image projection module is greatly reduced, and the intensity loss of a light source caused by stack of the plurality of light splitting apparatuses is avoided. Further, the ARM has a simplified structure requiring fewer elements, which provides hardware space for further improvement of the optical path, achieving good scalability.

The ARM disclosed herein provides a good human-machine interaction experience, may implement real-time labeling and real-time sharing of a field of view, and therefore, can be applied to a plurality of scenarios in different fields. For example, the ARM may be applied to the medical field to assist a pathologist in pathological diagnosis, disease detection, pathological report generation, remote medical consultation, pathological image database construction, and the like. The ARM may be applied to the teaching field as a teaching tool in a biological or pathological class. The ARM may be applied to the industrial field to observe and measure circuit boards and chips. An augmented reality module provides better human-machine interaction for a conventional microscope, for example, real-time labeling and real-time sharing of a field of view The ARM is described below by using a scenario of assisting a pathologist in pathological diagnosis. However, the description is not limited to this particular scenario as will be understood by those of skill in the art from the disclosure herein.

Figure 1:
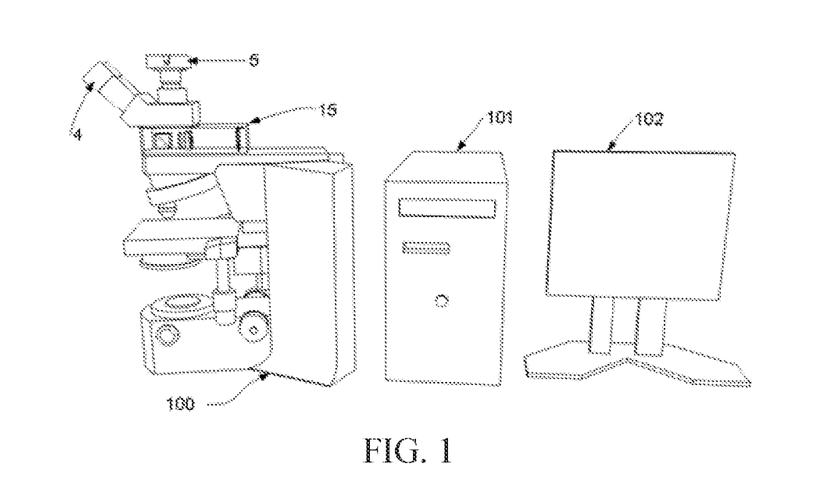
FIG. 1 is a diagram of a scenario of an augmented reality microscope (ARM) according to an embodiment.

FIG. 1 is a diagram of a scenario of an ARM according to an embodiment. As shown in FIG. 1, an observation tube of an ARM 100 includes a physical interface, the observation tube can be connected to an image obtaining module (or referred to as an image obtaining assembly or image obtaining component) 5 by the physical interface, and the image obtaining module 5 can obtain a pathological section image and transmit the image to an image processing device 101. The image processing device 101 processes the image by using an AI algorithm to obtain a processing result and outputs the processing result to an image projection module (or referred to as an image projection assembly or image projection component) 15 inserted in a microscope optical path. The processing result may include, but is not limited to, a contour map, a heat map, a label, and the like, and then the processing result is projected back to the original microscope optical path by using the image projection module 15, so that a user may observe, by using an eyepiece 4, information obtained after augmented reality information generated by a projection optical path is superimposed on the pathological section image. The superimposed information may be alternatively displayed by a display 102 connected to the image processing device 101 to facilitate tumor region detection and segmentation, cell counting, and the like.

The following describes a structure of the ARM in detail with reference to specific embodiments.

Figure 2:
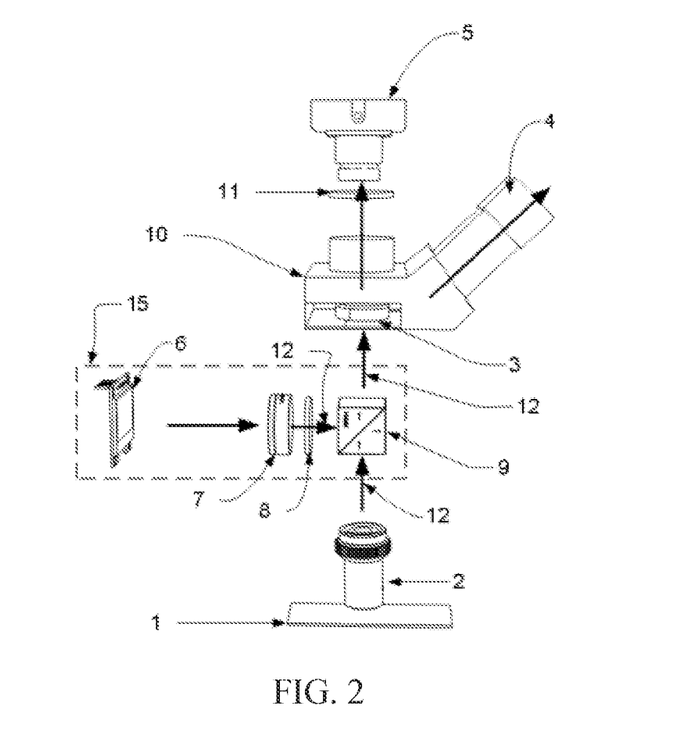
FIG. 2 is a diagram of an internal structure of an ARM according to an embodiment.
Figure 3:
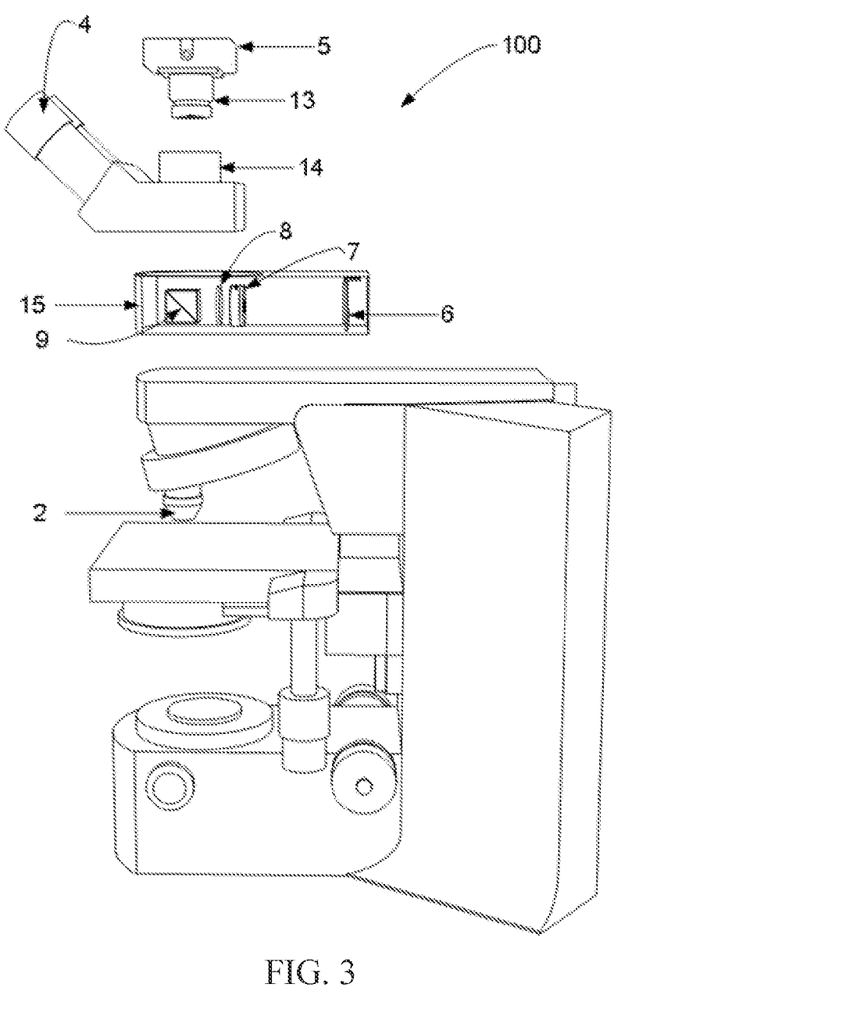
FIG. 3 is a three-dimensional view of an ARM according to an embodiment.

FIG. 2 is a diagram of an internal structure of an ARM according to an embodiment. FIG. 3 is a three-dimensional view of an ARM according to an embodiment. The ARM includes an objective lens 2, an eyepiece 4, an N-ocular observation tube 10, an image obtaining module 5, and an image projection module 15. The image obtaining module 5 is connected to the N-ocular observation tube 10 by a physical interface on the N-ocular observation tube 10.

The image projection module 15 includes an image projection apparatus 6, a lens apparatus 7, and a light splitting apparatus 9. After light generated by an observed object 1 during observation enters an optical path 12 through the objective lens 2 and light generated by the image projection apparatus 6 enters the optical path through the lens apparatus 7, the light converges at the light splitting apparatus 9 in the image projection module 15, and after the light following the convergence passes through the N-ocular observation tube 10, a first part of the light enters the eyepiece 4, and second part of the light enters the image obtaining module 5 to form an image.

The image obtaining module 5 is configured to output the formed image to an image processing apparatus (which is equivalent to the image processing device 101 shown in FIG. 1), and the image processing apparatus processes the image and outputs a processing result to the image projection apparatus 6.

The following describes the elements of the ARM and connection relationships therebetween in detail.

For the N-ocular observation tube 10, N represents a quantity of optical paths, and N is an integer greater than 2. In an example, referring to FIG. 1, the N-ocular observation tube 10 may be set as a trinocular observation tube. That is, N is set to 3. Three optical paths respectively correspond to the image obtaining module 5 and two eyepieces 4. In some possible implementations, two operators may perform observation based on the ARM simultaneously. Based on this, the N-ocular observation tube may be set as a six-ocular observation tube. In this case, a quantity of optical paths is specifically six, and the optical paths respectively correspond to two image obtaining modules 5 and four eyepieces 4. The foregoing description includes only some specific examples of the observation tube, and the quantity of optical paths corresponding to the observation tube corresponding to may be set according to actual requirements. For ease of understanding, descriptions are provided below by using a trinocular observation tube as an example.

For the objective lens 2, the amplification effect of the ARM mainly depends on the objective lens 2, and a quality of the objective lens 2 directly affects the imaging quality of the ARM. Based on this, when the objective lens 2 is selected, any one or more of an achromatic objective lens, a flat-field achromatic objective lens, a flat-field semiapochromatic objective lens, or a flat-field apochromatic objective lens may be selected to correct chromatic aberration, so as to improve the imaging quality.

Considering that different magnifications may be required during observation of an object (e.g., different magnifications need to be used for the same observed object such as an outline and an inner core of a cell, or different magnifications need to be used for observed objects with different sizes), a combination of objective lenses with different magnifications may be further provided for selection by a user. For example, a combination of objective lenses with magnifications of 4.0×, 10.0×, 20.0×, 60.0×, and 100.0× can be provided for selection by the user.

For the image obtaining module 5, the image obtaining module 5 converges light generated by the observed object 1 during observation and light generated by the image projection apparatus 6 at the light splitting apparatus 9, and forms an image for acquisition by using a part of light split by the light splitting apparatus 9. Based on this, the image obtaining module 5 may be specifically a camera. In some possible implementations, the image obtaining module 5 may be a photosensitive chip-based camera.

In some possible implementations, referring to FIG. 3, the image obtaining module 5 may be a photosensitive chip-based camera. A camera interface 14 is provided on a top end of the N-ocular observation tube 10. In this case, the foregoing physical interface is the camera interface 14. The camera interface 14 may be specifically a standard camera interface, so that the N-ocular observation tube 10 is connected to the camera based on the standard camera interface, to implement image acquisition.

Considering that the camera interfaces may not be uniform, for compatibility with a plurality of cameras or to zoom in or out a field of view, referring to FIG. 3, the camera may be further used in cooperation with a camera adapter 13, and the photosensitive chip-based camera is connected to the camera interface 14 on the top end of the N-ocular observation tube 10 by the camera adapter 13, so that the camera is connected to the N-ocular observation tube 10. A second polarizer 11 may be further embedded in the camera adapter 13, and the function of the second polarizer 11 is to filter out light that has a polarization state and is perpendicular to the second polarizer 11 to avoid interference with imaging.

The photosensitive chip-based camera may be a large photosensitive area camera and may be used in cooperation with a 1× camera adapter, or may be a small photosensitive area camera and may be used in cooperation with one of 0.75×, 0.63×, 0.5×, and 0.35× camera adapters. When the image obtaining module 5 is the large photosensitive area camera, the image obtaining module is used in cooperation with the 1× camera adapter, and when the image obtaining module 5 is the small photosensitive area camera, the image obtaining module is used in cooperation with one of the 0.75×, 0.63×, 0.5×, and 0.35× camera adapters.

The large photosensitive area camera may include, but is not limited to: a camera based on a 25 mega pixels (MP) photosensitive chip VITA 25K, Python 25K, or NOIP1SE025KA-GDI/ON Semi, such as S-25A30, S-25A70, and S-25A80 of an Adimec manufacturer, Genie Nano-CL C5100 of a Teledyne Dalsa manufacturer, IC-C25N-CL and IC-C25B-CL of an ISVI manufacturer, and hr25CCL of an SVS-VISTEK manufacturer, a camera based on a 50MP photosensitive chip ams/CMOSIS CMV50000, such as CMV-50 of an illunis manufacturer, S-50A30 of the Adimec manufacturer, and IC-X50 of the ISVI manufacturer, a camera based on a full-frame advanced photo system-H (APS-H) or medium-frame photosensitive chip, such as a camera based on 120MP photosensitive chip 120MXSC/Canon such as SHR series of the SVS-VISTEK manufacturer, and another camera based on medium-frame photosensitive chips IMX411 and IMX461 in Sony.

In addition to an industrial camera, single-lens reflex or mirrorless full-frame and medium-frame cameras for photography may be alternatively included, such as full-frame mirrorless cameras ILCE-9, ILCE-7RM3, ILCE-7RM2, ILCE-7M3, and ILCE-7SM2 or a single-lens reflex camera ILCA-99M2 of the Sony manufacturer, full-frame single-lens reflex cameras D850, D810A, and D810 or mirrorless cameras Z7 and Z6 of the Nikon manufacturer, and EOS-1D X Mark II, EOS 5D Mark IV, EOS 5DS/EOS 5DS R or mirrorless cameras EOS R and EOS RP of the Canon manufacturer.

The small photosensitive area camera includes, but is not limited to: cameras produced based on photosensitive chips with sizes between ⅓ inches to ⅔ inches of Sony. The photosensitive chips include, but are not limited to: IMX317, IMX377, IMX477, IMX577, IMX277, IMX533, IMX458, IMX383, IMX283, IMX183, IMX204, and IMX147 of Sony.

The image projection module 15 may be detachable, and the image projection module may be combined with a common microscope to form the ARM of this application. During actual application, the image projection module 15 may provide a standard interface and then is adapted to a plurality of microscopes by using adapters, and the microscopes may include, but are not limited to, upright or inverted or stereoscopic microscopes such as Nikon, Olympus, Leica, Zeiss, Motic, and SUNNY. For example, a Nikon Ci series microscope, an Olympus BX series microscope, a Leica DM series microscope, a Zeiss Axio Imager series microscope, a Motic Panthera series microscope, a BA series microscope, an M series microscope, or a SUNNY RX series microscope.

One core component of the image projection module 15 is an image projection apparatus 6. The image projection apparatus 6 may be, for example, a projection device based on a liquid crystal display (LCD), an organic light-emitting diode (OLED), a digital micromirror device (DMD), a reflective projection display (liquid crystal on silicon (LCoS)), or a micro-LED, the projection device including a micro display.

The micro display based on the LCD may include, but is not limited to, a silicon X-tal reflective display (SXRD) and a high temperature p-Si (HTPS) thin-film transistor (TFT) LCD micro display of a Sony manufacturer, for example, SXRD101A, SXRD241A, LCX187B, LCX202A, LCX173B, LCX172B, and micro LCD displays SXGA LBC, SXGA LVD, SVGA LSC, VGA LVS, and WQVGA LVS of a Kopin manufacturer. Another manufacturer of the projection device based on the LCD includes, but is not limited to, Epson, 3M, LG, Panasonic, Samsung, and Canon.

The manufacturers of the micro display based on the OLED include, but are not limited to, Sony, eMagin, Epson, Samsung, and LG. The OLED micro display of Sony may be, for example, ECX335B, ECX339A, ECX337A, ECX331D, ECX334C, ECX334C, ECX334A, and ECX336B, the OLED micro display of eMagin may be, for example, 2k Display, DSVGA, SXGA096, SXGA120, VGA, and WUXGA, and the AMOLED micro display of Kopin may be, for example, Lightning 2K and Lightning 720.

The manufacturer of the projection device based on the DMD includes, but is not limited to, a digital light processing (DLP) product of Texas Instruments (TI), and some DLP chips of TI may be, for example, DLP660TE, DLP9000, DLP4710, DLP6500, DLP9500, DLP3310, DLP4500, DLP4501, DLP5500, DLP7000, DLP3010, DLP2010, and DLP3000.

The projection device based on the LCoS includes, but is not limited to, HED6001, HED2200, HED5216, HED7200, HED5201, HED1316, and HED1016 of a HOLOEYE manufacturer and FLCoS with 2k*2k and WQHD resolutions of the Kopin manufacturer.

Another component of the image projection module 15 is the light splitting apparatus 9. The light splitting apparatus 9 may be a beam splitter or a beam splitter prism, and the function of the beam splitter or the beam splitter prism is to project a part of light and reflect another part of the light to implement light splitting. During operation, the light splitting apparatus 9 includes a cube beam splitter prism, a plate beam splitter prism, or a thin-film beam splitter prism. The light splitting apparatus 9 may be a polarization beam splitter prism or may be a non-polarization beam splitter prism.

In the example shown in FIG. 2 and FIG. 3, in the ARM, a group of polarizers (e.g., the first polarizer 8 and the second polarizer 11) of which polarization directions are perpendicular to each other are added in the optical path to block light of an optical path in which the image projection apparatus 6 is located from entering the N-ocular observation tube 10 and being acquired by the image obtaining module 5. When the light splitting apparatus 9 adopts the polarization beam splitter, the first polarizer 8 may be omitted.

The image projection module 15 further includes a first polarizer 8, a second polarizer 11 that is disposed at a position at which the image obtaining module 5 is connected to a physical interface on the N-ocular observation tube 10, and polarization directions of the first polarizer 8 and the second polarizer 11 are perpendicular to each other. Correspondingly, light generated by an image projection apparatus 6 in the image projection module 15 enters an optical path 12 through the lens apparatus 7 and the first polarizer 8; light emitted by an observed object 1 such as a biological sample illuminated by a microscope light source also enters the optical path 12 through an objective lens 2. The two paths of light converge at the light splitting apparatus 9, the light after the convergence passes through a sleeve lens 3 in the N-ocular observation tube 10 and is imaged, and then passes through a beam splitter prism (not shown in FIG. 2 and FIG. 3) inside the N-ocular observation tube 10, so that a part of the light is imaged to retina of the human eye again through an eyepiece 4 and is perceived by a person, and another part of the light is imaged at the image obtaining module 5. The light imaged at the image obtaining module 5 is filtered by the second polarizer 11 and then enters the image obtaining module 5.

In some possible implementations, a time division multiplexing mechanism may be further used for operations of the image projection module 15 and the image obtaining module 5, so that light of the image projection module is prevented from interfering with the image obtaining module 5.

Figure 4:
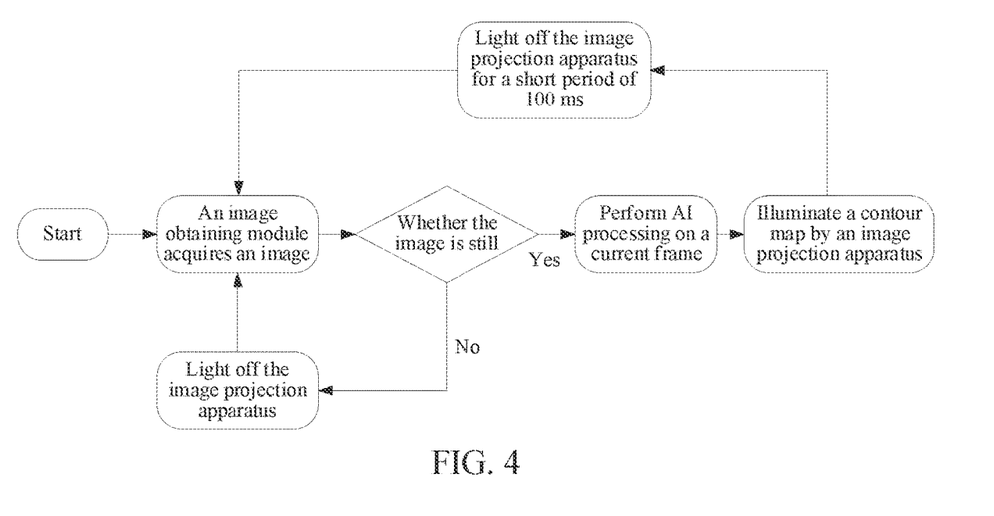
FIG. 4 is a flowchart of time division multiplexing according to an embodiment.

FIG. 4 is a flowchart of time division multiplexing according to an embodiment. When the ARM starts running, the image obtaining module 5 acquires an image and then determines whether the acquired image is still. If the acquired image is not still, the image projection apparatus 6 in the image projection module 15 is lighted off, and if the acquired image is still, AI processing is performed on a current frame to obtain a processing result. The processing result may be specifically a contour map. The contour map is then illuminated by the image projection apparatus 6, the image projection apparatus 6 is lighted off for a short period of 100 milliseconds (ms), and then the image obtaining module 5 acquires the image.

When the time division multiplexing mechanism is adopted to achieve anti-interference, the first polarizer 8 and the second polarizer 11 may be omitted. That is, to avoid interference caused by the light of the image projection module 15 entering the image obtaining module 5, any one of the two mechanisms may be adopted.

It may be understood that the ARM provided by the embodiments reserves more spaces in the microscope optical path and brings convenience for subsequent functional extension. Such extension includes, but is not limited to, an autofocus optical path, a multi-channel image acquisition optical path, and the like.

In some possible implementations, the image projection module 15 may further include an aperture stop. The aperture stop refers to the an effective light blocking aperture of an optical system to control light energy of an imaging beam, and the function of the aperture stop is to receive light. The aperture stop may be added into a position between the lens apparatus 7 and the light splitting apparatus 9 and close to the light splitting apparatus 9 so that intra-aperture light enters the optical path 12, thereby eliminating the interference light.

In some possible implementations, the image projection module 15 may further include a plane mirror. The plane mirror may reduce a distance between the image projection apparatus 6 and the lens apparatus 7, and light is reflected through the plane mirror to meet a light propagation distance requirement. In this way, a size of the entire image projection module 15 may be reduced.

During operation, the image projection module 15 may further include a spiral apparatus and/or a filter. The spiral apparatus is mainly configured to adjust a focal length, and the lens apparatus 7 may be built in the spiral apparatus. The filter may be configured to filter light of a specific color, and the filtering characteristic may be set according to actual requirements. The filter may be disposed at any position between the image projection apparatus 6 and the light splitting apparatus 9 according to actual requirements.

The embodiments provide an ARM. The ARM omits an image obtaining optical path in optical paths in the ARM, provides direct access to a camera by using a standard camera interface on the top end of a trinocular observation tube of the microscope, and utilizes with only an image projection optical path left in the optical paths to form a novel ARM. To prevent light of the image projection optical path from entering the camera, two mutually perpendicular polarizers are respectively placed near surfaces of the image projection optical path and a photosensitive chip of the camera, and the image obtaining optical path and the image projection optical path are independent of each other, so that the debugging of the image obtaining optical path and the debugging of the image projection optical path do not interfere with each other, which facilitates registration and calibration of images and may ensure the accuracy of a final processing result.

In addition, the image projection module requires only one light splitting apparatus but not a plurality of light splitting apparatuses stacked together. Thus, elements are saved, and a height by which the augmented reality module is elevated by the microscope optical path is reduced, thereby avoiding the light source intensity loss caused by stack of the plurality of light splitting apparatuses and improving the user experience.

Moreover, the image obtaining module is placed at the standard camera interface on the top end of the observation tube, and redundant optical and mechanical elements such as a large-volume mechanical housing, and a lens or a lens group dedicated for camera imaging are eliminated. The reason is that the sleeve lens contained in the observation tube may directly image a sample in cooperation with the objective lens. Thus, the optical path is simpler, and the debugging and mounting are more convenient.

Since the image obtaining module is mounted in the observation tube, additional costs caused by the second beam splitter, the redundant mechanical housing, the lens or the lens group dedicated for camera imaging, which is similar to the function of the sleeve lens are saved, and especially, the sleeve lens is an optical device with high aberration accuracy and high costs.

In addition, more spaces are reserved in the microscope optical path, such that hardware space is provided for subsequent functional extension, achieving good scalability.

Based on the ARM provided in the embodiments, the present disclosure further provides an image projection device configured to be connected to a microscope to form the ARM, which is equivalent to the image projection module 15 in the foregoing embodiment.

Figure 5:
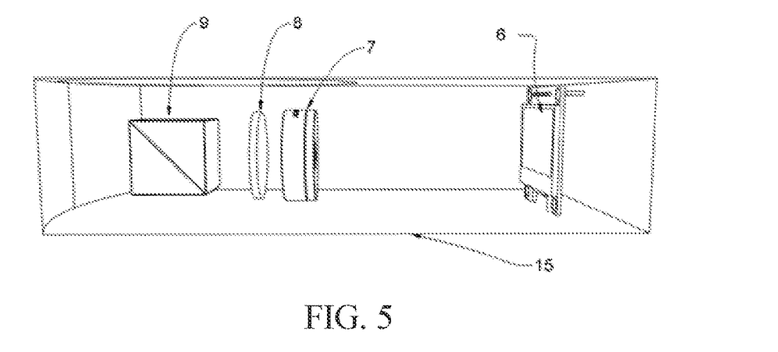
FIG. 5 is a diagram of an image projection device according to an embodiment.

FIG. 5 is a diagram of an image projection device according to an embodiment. The image projection device includes an image projection apparatus 6, a lens apparatus 7, and a light splitting apparatus 9. The image projection apparatus 6 is configured to obtain a processing result obtained by processing an image by an image processing apparatus and perform image projection on the processing result. After projected light enters an optical path through the lens apparatus 7 and light generated by an observed object observed by the microscope enters the optical path through an objective lens of the microscope, the light converges at the light splitting apparatus 9, and after the light following the convergence passes through an N-ocular observation tube of the microscope, a part of the light enters an eyepiece of the microscope, and another part of the light enters an image acquisition device, the image acquisition device being equivalent to the image obtaining module 5 in the foregoing embodiment.

The image projection apparatus 6 may include a projection device based on an LCD, an OLED, a DMD, an LCoS, or a micro-LED, and for a specific implementation, reference may be made to the description of related content in the foregoing.

To avoid interference caused by the image projection apparatus 6 on the image obtaining module 5 in the microscope, a first polarizer 8 may be further added into the image projection device, and a polarization direction of the first polarizer 8 is perpendicular to a polarization direction of a second polarizer in the microscope. After the projected light enters the optical path through the lens apparatus 7 and the first polarizer 8, and the light generated by the observed object enters the optical path through the objective lens of the microscope, the light converges at the light splitting apparatus 9, and after the light following the convergence passes through the N-ocular observation tube of the microscope, a part of the light enters the eyepiece of the microscope, and the another part of the light enters the image acquisition device through the second polarizer.

Further, the image projection device may further include any one or more of an aperture stop, a plane mirror, a spiral apparatus, and a filter. The aperture stop may be deployed between the lens apparatus 7 and the light splitting apparatus 9 and close to the light splitting apparatus 9, so that intra-aperture light enters the optical path, thereby eliminating the interference light. The plane mirror may be deployed between the image projection apparatus 6 and the lens apparatus 7. Light is reflected by using the plane mirror to meet a light propagation distance requirement, thereby reducing a distance between the image projection apparatus 6 and the lens apparatus 7, further reducing a size of the image projection device.

The spiral apparatus is mainly configured to adjust a focal length and may be deployed between the image projection apparatus 6 and the light splitting apparatus 9, and the lens apparatus 7 may be built in the spiral apparatus. The filter may be disposed at any position between the image projection apparatus 6 and the light splitting apparatus 9 according to actual requirements to filter light of a specific color, and the filtering characteristic may be set according to actual requirements.

This application further provides an image processing system, including an image processing device and the ARM according to the embodiments. The image processing device is configured to perform image processing on an image obtained by the image obtaining module in the ARM and output a processing result to the image projection module in the ARM.

The image processing device and the ARM can communicate with each other in a wired manner, or may communicate with each other in a wireless manner. The image processing device may be a desktop computer such as an all-in-one machine, an assembling machine formed by a case and a display screen, or may be a notebook computer, a workstation, or another terminal device having an operation function.

According to the foregoing technical solutions, the embodiments have the following advantages:

In the embodiments, an ARM is provided. An image obtaining module is transferred to an N-ocular observation tube, and the image obtaining module is connected to the N-ocular observation tube by a physical interface of the N-ocular observation tube. Therefore, after light generated by an observed object during observation enters an optical path through an objective lens and light generated by an image projection apparatus in an image projection module enters the optical path through a lens apparatus, the light converges at a light splitting apparatus in the image projection module, and after the light after the convergence passes through the N-ocular observation tube, a part of the light enters an eyepiece, and another part of the light enters the image obtaining module to form an image. The image obtaining module outputs the acquired image to an image processing apparatus, and the image processing apparatus processes the image and outputs a processing result to an image projection apparatus. An image obtaining optical path and an image projection optical path are independent of each other and do not interfere with each other, which facilitates registration and calibration of images and can ensure the accuracy of a final processing result, thereby improving the quality of an augmented reality (AR) image. In addition, an image projection module does not require a plurality of light splitting apparatuses stacked together, so that a height by which the ARM is elevated is reduced, and the intensity loss of a light source caused by stack of the plurality of light splitting apparatuses is avoided, thereby improving the user experience. Moreover, the ARM saves elements, simplifies the structure, and provides hardware space for further improvement of the optical path.

A person skilled in the art can clearly understand that for convenience and conciseness of description, for specific working processes of the foregoing systems, apparatuses and units, reference may be made to the corresponding processes in the foregoing method embodiments, and details are not described herein again.

In the several embodiments provided in this application, it is to be understood that the disclosed system, apparatus, and method may be implemented in other manners. For example, the described apparatus embodiment is merely an example. The unit division is merely logical function division and may be other division during actual implementation. A plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The computer software product is stored in a storage medium and includes several instructions for instructing a computer device (which may be a PC, a server or a network device) to perform all or some of the steps of the methods described in the embodiments. The foregoing storage medium includes, any medium that can store program code, such as a USB flash drive, a removable hard disk, a read-only memory (ROM), a random access memory (RAM), a magnetic disk, or an optical disc.

It is to be understood that in this application. "at least one (item)" refers to one or more and "a plurality of" refers to two or more. The term "and/or" describes an association between associated objects and represents that three associations may exist. For example, "A and/or B" may indicate that only A exists, only B exists, and both A and B exist, where A and B may be singular or plural. The character "/" in this specification generally indicates an "or" relationship between the associated objects. "At least one of the following" or a similar expression thereof refers to any combination of these items, including one item or any combination of more items. For example, at least one of a, b, or c may indicate: a, b, c, "a and b", "a and c", "b and c", or "a, b, and c", where a, b, and c may be singular or plural.

The foregoing embodiments are merely intended for describing the technical solutions of this application, but not for limiting this application. Although this application is described in detail with reference to the foregoing embodiments, a person of ordinary skill in the art understand that they may still make modifications to the technical solutions described in the foregoing embodiments or make equivalent replacements to some technical features thereof, without departing from the spirit and scope of the technical solutions of the embodiments.

What is claimed is:

1. An augmented reality microscope (ARM), comprising:
an objective lens;
an eyepiece;
an N-ocular observation tube, wherein N is a positive integer greater than 2;
an image obtaining module physically connected to the N-ocular observation tube by a physical interface on the N-ocular observation tube; and
an image projection module comprising an image projection apparatus, a lens apparatus, and a light splitting apparatus;
wherein light generated by an observed object during observation that enters an optical path through the objective lens and light generated by the image projection apparatus that enters the optical path through the lens apparatus converges at the light splitting apparatus in the image projection module,
wherein the converged light passes through the N-ocular observation tube,
wherein a first part of the converged light enters the eyepiece, and a second part of the converged light enters the image obtaining module to form an image;
wherein the image obtaining module is configured to output the formed image to the image processing apparatus configured to process the image and output a processing result to the image projection apparatus,
wherein the image projection module further comprises a first polarizer and a second polarizer that is disposed at a position at which the image obtaining module is connected to the physical interface on the N-ocular observation tube,
wherein polarization directions of the first polarizer and the second polarizer are perpendicular to each other,
wherein the light generated by the image projection apparatus in the image projection module enters the optical path through the lens apparatus and the first polarizer,
wherein after the converged light passes through the N-ocular observation tube, the first part of the converged light enters the eyepiece, and the second part of the converged light enters the image obtaining module through the second polarizer.

2. The ARM of claim 1, wherein the image projection module and the image obtaining module utilize a time division multiplexing mechanism.

3. The ARM of claim 1, wherein the image obtaining module comprises a photosensitive chip-based camera.

4. The ARM of claim 3, wherein the physical interface includes a camera interface, and the image obtaining module is physically connected to the N-ocular observation tube by the photosensitive chip-based camera being connected to the camera interface on a top end of the N-ocular observation tube by a camera adapter.

5. The ARM of claim 1, wherein the image projection apparatus comprises a projection device based on a liquid crystal display (LCD), an organic light-emitting diode (OLED), a digital micromirror device (DMD), a liquid crystal on silicon (LCoS), or a micro light-emitting diode (micro-LED).

6. The ARM of claim 1, wherein the light splitting apparatus comprises a cube beam splitter prism, a plate beam splitter prism, or a thin-film beam splitter prism.

7. The ARM of claim 1, wherein the objective lens comprises an achromatic objective lens, a flat-field achromatic objective lens, a flat-field semiapochromatic objective lens, or a flat-field apochromatic objective lens.

8. The ARM of claim 1, wherein the image projection module further comprises any one or more of an aperture stop, a plane mirror, a spiral apparatus, and a filter.

9. The ARM of claim 1, wherein the N-ocular observation tube comprises a trinocular observation tube or a six-ocular observation tube.

10. A method of an augmented reality microscope (ARM), the ARM including an objective lens, an eyepiece, an N-ocular observation tube, wherein N is a positive integer greater than 2, an image obtaining module physically connected to the N-ocular observation tube by a physical interface on the N-ocular observation tube, and an image projection module including an image projection apparatus, a lens apparatus, and a light splitting apparatus, the method comprising:
  generating light by the image projection apparatus;
  converging, at the light splitting apparatus, light generated by an observed object that enters an optical path through the objective lens and the light generated by the image projection apparatus;
  passing the converged light through the N-ocular observation tube, thereby splitting the converged light into a first part that enters the eyepiece and a second part;
  forming an image based on the second part of the converged light entering the image obtaining module;
  outputting the formed image to the image processing apparatus;
  processing the formed image; and
  outputting a processing result based on the processed formed image,
  wherein the image projection module further comprises a first polarizer and a second polarizer that is disposed at a position at which the image obtaining module is connected to the physical interface on the N-ocular observation tube,
  wherein polarization directions of the first polarizer and the second polarizer are perpendicular to each other,
  wherein the light generated by the image projection apparatus in the image projection module enters the optical path through the lens apparatus and the first polarizer,
  wherein after the converged light passes through the N-ocular observation tube, the first part of the converged light enters the eyepiece, and the second part of the converged light enters the image obtaining module through the second polarizer.

11. The method of claim 10, wherein the image projection module and the image obtaining module utilize a time division multiplexing mechanism.

12. The method of claim 10, wherein the image obtaining module comprises a photosensitive chip-based camera.

13. The method of claim 12, wherein the physical interface includes a camera interface, and the image obtaining module is physically connected to the N-ocular observation tube by the photosensitive chip-based camera being connected to the camera interface on a top end of the N-ocular observation tube by a camera adapter.

14. The method of claim 10, wherein the image projection apparatus comprises a projection device based on a liquid crystal display (LCD), an organic light-emitting diode (OLED), a digital micromirror device (DMD), a liquid crystal on silicon (LCoS), or a micro light-emitting diode (micro-LED).

15. The method of claim 10, wherein the light splitting apparatus comprises a cube beam splitter prism, a plate beam splitter prism, or a thin-film beam splitter prism.

16. The method of claim 10, wherein the objective lens comprises an achromatic objective lens, a flat-field achromatic objective lens, a flat-field semiapochromatic objective lens, or a flat-field apochromatic objective lens.

17. The method of claim 10, wherein the image projection module further comprises any one or more of an aperture stop, a plane mirror, a spiral apparatus, and a filter.

18. An image projection device, configured to be connected to a microscope to form an augmented reality microscope (ARM), the image projection device comprising:
  an image projection apparatus;
  a lens apparatus; and
  a light splitting apparatus,
  wherein the image projection apparatus is configured to obtain a processing result by processing an image by an image processing apparatus and perform image projection on the processing result, and
  wherein projected light enters an optical path through the lens apparatus and light generated by an observed object observed by the microscope enters the optical path through an objective lens of the microscope converge at the light splitting apparatus, and, after the converged light passes through an N-ocular observation tube of the microscope, a first part of the light enters an eyepiece of the microscope, and a second part of the light enters an image acquisition device, forming the image,
  wherein the image projection device further comprises a first polarizer and a second polarizer that is disposed at a position at which the image acquisition device is connected to a physical interface on the N-ocular observation tube,
  wherein polarization directions of the first polarizer and the second polarizer are perpendicular to each other,
  wherein the light enters the optical path through the lens apparatus and the first polarizer, and
  wherein after the converged light passes through the N-ocular observation tube, the first part of the converged light enters the eyepiece, and the second part of the converged light enters the image acquisition device through the second polarizer.

* * * * *